(No Model.)

G. B. OKEY.
HORSE HITCHING DEVICE.

No. 548,653. Patented Oct. 29, 1895.

WITNESSES.
M. McDonald
C. V. Thurman

INVENTOR.
George B. Okey
BY
Jno S Thurman
ATTORNEY.

UNITED STATES PATENT OFFICE.

GEORGE BURTON OKEY, OF INDIANAPOLIS, INDIANA.

HORSE-HITCHING DEVICE.

SPECIFICATION forming part of Letters Patent No. 548,653, dated October 29, 1895.

Application filed March 20, 1895. Serial No. 542,503. (No model.)

*To all whom it may concern:*

Be it known that I, GEORGE BURTON OKEY, a citizen of the United States, residing at Indianapolis, in the county of Marion and State of Indiana, have invented certain new and useful Improvements in Horse-Hitching Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in a device for hitching horses; and it consists of a novel construction, combination, and arrangement of parts, as will be hereinafter fully described, and properly pointed out in the claims.

The object of my invention is to provide a simple and inexpensive device for hitching horses to a curbstone on the sidewalk or any other suitable place, yet strong and durable and efficient in desired results.

Similar letters of reference indicate the same parts throughout both views.

A practical embodiment of my invention is represented in the accompanying drawings, in which—

Figure 1:
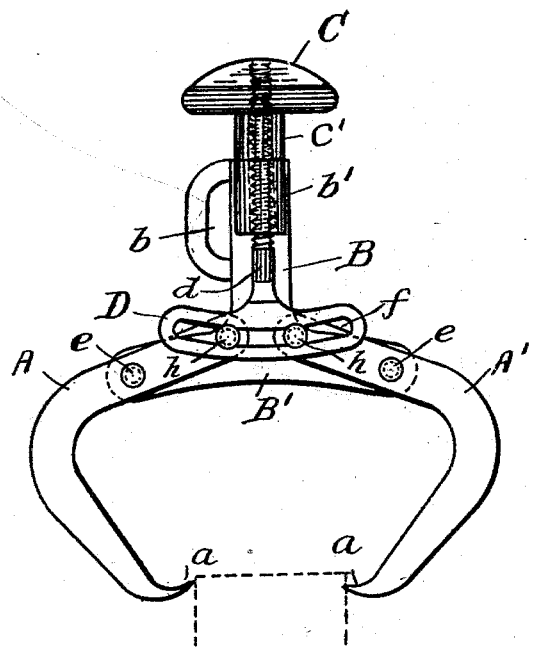
Figure 2:
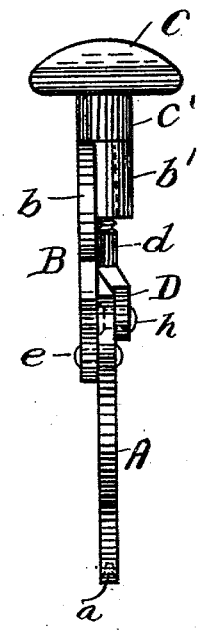

Figure 1 is a front elevation showing the device open ready to be screwed to the curbstone. Fig. 2 is a side view of Fig. 1.

In the accompanying drawings, A and A' designate the tongs which are fulcrumed to the frame B. The grip end of the tongs A and A' is curved inward and upward and has a sharp point $a$, in order that it may be securely fastened to a suitable hitching-place.

$d$ is the bolt with the upper part threaded and has the slotted base D, the said slot in the arc of a circle and to which the top end of the tongs are engaged by means of the pins $h$.

$b'$ is the boss made integral with the frame, through which the threaded bolt passes freely. Said frame also has a boss with an opening through which the hitching-strap is intended to pass. This boss is also made integral with the frame. The frame is made in the outline of an inverted T and which has the base B'.

C is the handle which has the boss C' and is threaded to receive the bolt $d$, which is intended to be screwed toward the right to close the tongs A and A'.

In operation loosen the handle C, which will cause the tongs to open at the lower end wide enough to grip the curb, then screw down the handle C, which will draw inward the tongs at the bottom and firmly grip the object.

It will be seen that after the device is attached to the curb the stronger the horse pulls on the hitching-strap, which is attached to the boss $b$, it will have a tendency to further increase the grip.

Having thus described my invention, what I claim, and desire to secure by Letters Patent, is—

1. The combination with the frame and boss, of a screw threaded bolt carried in said boss having a slotted base, tongs fulcrumed on said frame, having pins upon one end engaging the slotted base, and an internally screw threaded handle screwed upon the end of the bolt, adapted to open and close the tongs, substantially as described.

2. In combination the frame and boss $b'$, the jaws centrally pivoted to said frame, the bolt having an enlarged transversely slotted end, pins projecting from said jaws into said slot and the means for operating said bolt to open and close said jaws, substantially as described.

In testimony whereof I affix my signature in presence of two witnesses.

GEORGE BURTON OKEY.

Witnesses:
CHARLES W. MOORES,
JNO. S. THURMAN.